(12) United States Patent
Pankoke et al.

(10) Patent No.: US 8,757,865 B2
(45) Date of Patent: Jun. 24, 2014

(54) FOODSTUFF CONVEYOR APPARATUS AND METHOD OF CONVEYING A FOODSTUFF

(71) Applicant: VEMAG Maschinenbau GmbH, Verden/Aller (DE)

(72) Inventors: Uwe Pankoke, Rethem (DE); Tobias Kiel, Verden (DE); Kersten Nilsson, Verden (DE)

(73) Assignee: Vemag Maschinenbau GmbH, Verden/Aller (DE)

( * ) Notice: Subject to any disclaimer, the term of this patent is extended or adjusted under 35 U.S.C. 154(b) by 0 days.

(21) Appl. No.: 14/031,232

(22) Filed: Sep. 19, 2013

(65) Prior Publication Data

US 2014/0076693 A1    Mar. 20, 2014

(30) Foreign Application Priority Data

Sep. 20, 2012   (DE) .......................... 10 2012 216 912

(51) Int. Cl.
*B65G 33/08*   (2006.01)
*B65G 33/26*   (2006.01)

(52) U.S. Cl.
USPC .......... 366/88; 366/90; 198/457.04; 198/548; 198/625

(58) Field of Classification Search
USPC ................... 198/457.04, 545, 548, 617, 625; 366/79, 83, 88, 90; 426/519
See application file for complete search history.

(56) References Cited

U.S. PATENT DOCUMENTS

| | | | |
|---|---|---|---|
| 1,848,236 A | 3/1932 | Anderson | |
| 3,008,184 A | 11/1961 | Fritsch | |
| 3,235,640 A | 2/1966 | Carton et al. | |
| 4,590,081 A * | 5/1986 | Sawada et al. | 426/448 |
| 4,844,935 A * | 7/1989 | Fere et al. | 426/549 |
| 5,126,159 A * | 6/1992 | Manser et al. | 426/549 |
| 5,667,833 A * | 9/1997 | Juengling et al. | 426/496 |
| 5,823,123 A * | 10/1998 | Waldner | 110/257 |
| 5,891,502 A * | 4/1999 | Heck et al. | 426/516 |

(Continued)

FOREIGN PATENT DOCUMENTS

| | | |
|---|---|---|
| CH | 389531 A | 3/1965 |
| DE | 1099996 B | 2/1961 |
| DE | 1529834 A1 | 1/1970 |
| DE | 3334394 A1 | 4/1985 |
| DE | 102005059856 A1 | 6/2007 |

(Continued)

OTHER PUBLICATIONS

European Patent Office, Search Report issued in European Patent Application No. 13183607.4 dated Jan. 24, 2014.

*Primary Examiner* — Douglas Hess
(74) *Attorney, Agent, or Firm* — Wood, Herron & Evans, LLP

(57) ABSTRACT

Conveyor apparatus and methods of conveying a foodstuff. A foodstuff conveyor apparatus may include a foodstuff inlet, a foodstuff outlet, and a conveyor chamber coupling the inlet to the outlet. A conveyor screw having an axis oriented longitudinally in the conveyor chamber may be configured to urge the foodstuff from the inlet towards the outlet. The conveyor screw may have a spindle at each end, with a spindle free portion between the spindles. The screw may be positioned in the conveyor chamber so that one spindle is near the outlet, and the other spindle is near the inlet. The spindles may be configured so that the pitch of the screw near the outlet is less than the pitch of the screw near the inlet to provide a mixing and compacting effect as the foodstuff is conveyed from the inlet to the outlet.

13 Claims, 3 Drawing Sheets

(56) References Cited

U.S. PATENT DOCUMENTS

| | | | |
|---|---|---|---|
| 5,914,148 A * | 6/1999 | Kazemzadeh | 426/516 |
| 6,247,836 B1 * | 6/2001 | Nakajima et al. | 366/88 |
| 6,338,867 B1 | 1/2002 | Lihotzky-Vaupel | |
| 6,698,578 B2 * | 3/2004 | Lepage | 198/550.1 |
| 8,079,747 B2 * | 12/2011 | Ek et al. | 366/80 |
| 8,282,332 B2 | 10/2012 | Nill et al. | |
| 8,303,160 B2 * | 11/2012 | Schulz | 366/75 |
| 8,393,780 B2 * | 3/2013 | Wenger et al. | 366/85 |
| 2010/0208547 A1 | 8/2010 | Kiel et al. | |

FOREIGN PATENT DOCUMENTS

| | | |
|---|---|---|
| DE | 202009002115 U1 | 7/2010 |
| DE | 202011003212 U1 | 5/2011 |
| EP | 0294226 A2 | 12/1988 |
| EP | 0919127 A1 | 6/1999 |
| JP | 06054641 A | 1/1994 |
| JP | 10035852 A | 10/1998 |
| SU | 1405761 A1 | 6/1988 |
| WO | 2012100465 A1 | 8/2012 |

* cited by examiner

FOODSTUFF CONVEYOR APPARATUS AND METHOD OF CONVEYING A FOODSTUFF

BACKGROUND

The present invention concerns a foodstuff conveyor apparatus, in particular for meat or pasta products, comprising a foodstuff inlet, a foodstuff outlet, a conveyor chamber arranged between the inlet and the outlet, and a conveyor screw extending in the conveyor chamber.

Conveyor apparatuses of the above-mentioned kind are used for automated production and processing of pasty foodstuffs such as sausage meat, dough, or pasta. Hereinafter the term 'product' is also used synonymously for foodstuff. In the sector of the foodstuffs industry, there is on the one hand a high level of cost pressure, while on the other hand the demands on product quality are high. When conveying and processing pasty foodstuffs, the presence of gases that occur in the form of gas bubbles in the product flow assumes a great influence on the appearance of the product, and on the processing quality. Processing businesses and manufacturers of apparatuses for conveying foodstuffs are increasingly endeavouring to afford a high product quality with an appearance that is as good as possible.

In this respect, great significance is attributed to degassing. That is to say, the elimination of large gas bubbles from the product flow. Known apparatuses and methods use nozzles for reducing the size of gas bubbles in the product flow, the nozzles being introduced into the product flow downstream of conveyor apparatuses. By means of a reduction in the cross-section of the product flow being conveyed, these nozzles lead to a compacting effect whereby the flow speed rises downstream of the nozzle, and the gas bubbles in the product flow are torn open. Although the procedure for eliminating in particular large gas bubbles in such apparatuses and methods generally operates satisfactorily, the product is subjected to high shearing forces in the nozzle. These large shearing forces lead to product stressing, which is considered to be a disadvantage. In addition, large and/or shearing-sensitive constituents that are to be added cannot be conveyed through a nozzle, or the nozzle diameter has to be adapted to the constituent size, which influences optimum functioning of the nozzle.

With this background in mind, the object of the present invention is to provide a foodstuff conveyor apparatus that makes it possible to eliminate large gas bubbles in the foodstuff being conveyed, with a lower level of product stressing.

BRIEF SUMMARY

In a foodstuff conveyor apparatus of the kind set forth in the opening part of this specification, an object of embodiments of the invention is attained in that the conveyor screw has an inlet-side spindle portion, an outlet-side spindle portion, and a spindle-free portion separating the spindle portions. In this respect, the invention makes use of the realisation that homogenisation of the conveyed product as early as possible in the conveyor flow makes subsequent acceleration and shear loading by means of nozzles, for example, redundant. By means of a spindle-free portion provided in the conveyor chamber downstream of the conveyor chamber inlet, it is possible for the product being conveyed to be already so homogenised that the gas bubbles which are still present at the foodstuff inlet are already reduced in size and distributed by virtue of passing through the spindle-free portion. This occurs because there is no forced flow movement of the foodstuff prevailing in the spindle-free portion, but the foodstuff can be propagated chaotically. Homogenised in this way and provided with smaller distributed bubbles, the product that is delivered from the outlet of the conveyor chamber and ultimately delivered from the outlet of the foodstuff conveyor apparatus provides an improved appearance without it being necessary for the product to pass through a nozzle, which stresses the product.

A further advantage of the solution according to the invention is the compensation for pressure fluctuations achieved by the spindle-free portion. The spindle-free portion is used as a reservoir by being completely filled by the feed of foodstuff into the foodstuff inlet. Preferably, the pitch of the conveyor curve upstream of the spindle-free portion is greater than the pitch downstream of the spindle-free portion so that more material is transported into the spindle-free portion than out of the spindle-free portion.

The above-mentioned advantages are achieved both with foodstuff conveyor apparatuses having a conveyor chamber equipped with a single conveyor screw, and also in particular in foodstuff conveyor apparatuses having a conveyor chamber equipped with two conveyor screws. Such conveyor chambers are also a constituent part of double-spindle pumps.

A further development of the invention provides that the conveyor screw is a first conveyor screw, and the apparatus further has a second conveyor screw that extends in the conveyor chamber. The second conveyor screw is in meshing engagement with the first conveyor screw, and has an inlet-side spindle portion, an outlet-side spindle portion, and a spindle-free portion separating the spindle portions.

Preferably, the spindle-free portions of the first conveyor screw and of the second conveyor screw are arranged axially at one height in the conveyor chamber. In this respect, axially is to be interpreted in relation to the longitudinal axis of the conveyor chamber. In the case of parallel oriented conveyor screws, axially is accordingly also to be interpreted relative to the screw axes. Because the spindle-free portions are respectively arranged at the same height in the prechamber, the portion of the spindle-free portions has a region in the conveyor chamber in which the foodstuff that hitherto was conveyed separately by the conveyor screws is brought together and mixed together in a disordered (i.e., chaotic) flow. This achieves good homogenisation of the foodstuff and distribution of the bubbles.

Preferably, the spindle-free portion or portions are arranged downstream of the conveyor chamber inlet. This ensures that homogenisation can take place in a closed system. At the same time, the spindle-free portion or portions are preferably arranged upstream of the conveyor chamber outlet or the outlet of the foodstuff conveyor apparatus.

In accordance with a further embodiment of the invention, the pitch of the conveyor screw or the pitch of the conveyor screws in the outlet-side spindle portion is reduced in comparison with the inlet-side spindle portion. This provides that the volume flow conveyed in the inlet-side spindle portion is greater than the volume flow conveyed in the outlet-side spindle portion. This entails compacting of the foodstuff. Such compacting permits portioning directly following the passage through the conveyor apparatus. This is advantageous in particular in conjunction with the product passing through the outlet-side spindle portion being homogenised by virtue of passing through the spindle-free portion and enjoying good bubble distribution.

Preferably, 1.5 or more spindle revolutions are provided in the outlet-side spindle portion of the conveyor screw, or in the outlet-side spindle portion of the conveyor screws. This ensures that portioning can be effected with a high degree of repetition accuracy. Particularly preferably, the number of spindle revolutions is in a range of between 1.5 and 2.5. A good compromise between a low level of product stressing on the one hand and a high degree of portioning accuracy on the other hand is achieved in that selected range. This also entails acceptable portioning efficiency. The level of portioning accuracy is influenced outside this particularly preferred range by virtue of the fact that different numbers of chambers are formed between the conveyor screws in dependence on the rotary angle. The number of spindle revolutions may thereby correspond to the number of chambers.

Further preferably, 3 or fewer spindle revolutions are provided in the outlet-side spindle portion of the conveyor screw, or in the outlet-side spindle portion of the conveyor screws. In conjunction with the preferred pitches, this ensures that the product stressing does not become impermissibly high.

In a particularly preferred embodiment, the spindle-free portion of the conveyor screw, or the spindle-free portion of the conveyor screws, is of an axial length in a range of between 10 mm and 50 mm. This ensures that, with a simultaneous low level of structural complication and expenditure and reasonable foodstuff deployment, there is a sufficiently large reservoir for adjustment of the sealing region and for compensating for pressure fluctuations. In particular, a spindle pitch in the outlet-side spindle portion that is reduced in comparison with the inlet-side spindle portion ensures that the reservoir in the spindle-free portion is always completely filled during operation of the apparatus according to the invention.

In the apparatus according to the invention, the conveyor screw or the conveyor screws are preferably sealed off at least in a region between the conveyor chamber inlet and the spindle-free portion relative to the wall of the conveyor chamber. More specifically, the conveyor screw or the conveyor screws are sealed off to prevent a transfer of foodstuff from the spindle-free portion in the direction of the conveyor chamber outlet. This ensures that the reservoir afforded by the spindle-free portion remains completely filled, and optimum bubble distribution and a reduction in size by virtue of mixing of the fluid in the reservoir can be implemented. To improve degassing of the foodstuffs flow, it is advantageous if the seal between the conveyor screw or screws and the conveyor chamber between the conveyor chamber inlet and the spindle-free portion is not gas-tight, but only prevents the transfer of foodstuff so that gas displaced by compression of the foodstuff can escape.

The invention further concerns a method of conveying a foodstuff, in particular a meat or pasta product.

The invention also attains the object specified in the opening part of this specification in relation to the apparatus as set forth in the opening part of this specification for a method of the above-indicated kind, comprising the steps of:

introducing a foodstuff into a conveyor device by means of a foodstuff inlet, conveying the foodstuff through a conveyor chamber in the direction of a foodstuff outlet, wherein the foodstuff is conveyed in the conveyor chamber by a conveyor screw or by two conveyor screws that are in meshing engagement with each other, wherein the foodstuff in the conveyor chamber passes through a spindle-free portion that separates an inlet-side spindle portion and an outlet-side spindle portion.

In regard to the advantages of the method according to the invention, attention is directed to the foregoing discussion of the apparatus according to the invention. That also applies to the further developments of the method set forth hereinafter.

A preferred development of the method according to the invention provides that, with two conveyor screws in the conveyor chamber, the following step is performed:

bringing the foodstuff conveyed by the first conveyor screw together with the foodstuff conveyed by the second conveyor screw in the spindle-free portions, wherein the spindle-free portions of the first conveyor screw and the second conveyor screw are arranged axially at one height in the conveyor chamber.

Further preferably, the step of bringing the foodstuff conveyed by the first conveyor screw together with the foodstuff conveyed by the second conveyor screw is effected downstream of a conveyor chamber inlet.

Further preferably, the method according to the invention includes the step of proportioning of the conveyed foodstuff by means of the conveyor screw or the conveyor screws by means of passing the foodstuff through an outlet-side spindle portion of the conveyor screw or the conveyor screws, wherein the pitch of the conveyor screw or the pitch of the conveyor screws in the outlet-side spindle portion is reduced in comparison with the inlet-side spindle portion.

BRIEF DESCRIPTION OF THE SEVERAL VIEWS OF THE DRAWINGS

The invention is described in greater detail hereinafter by means of a preferred embodiment by way of example and with reference to the accompanying Figures in which.

DETAILED DESCRIPTION

Figure 1:
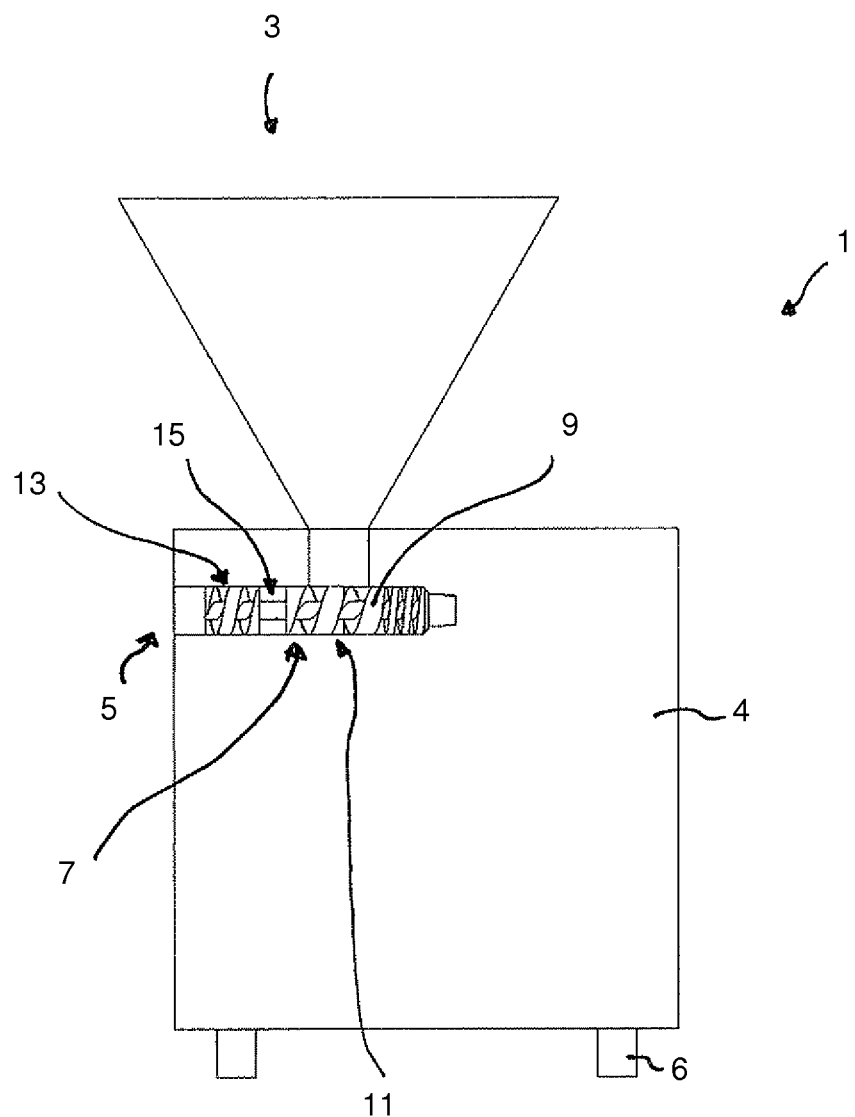
FIG. 1 shows a diagrammatic view of the apparatus according to the invention in accordance with a preferred embodiment.
Figure 3:
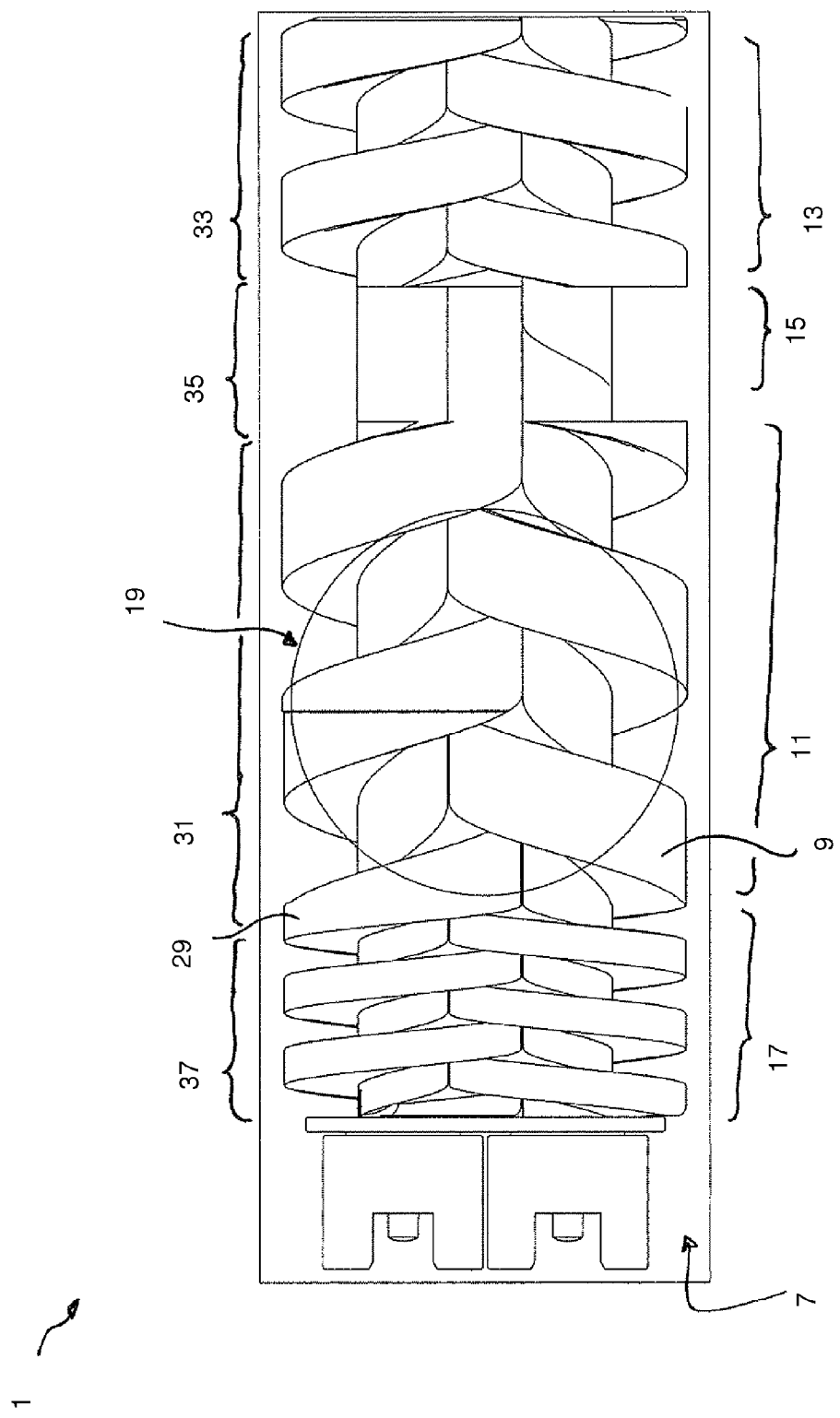
FIG. 3 shows a projection of the detail view of FIG. 2.

FIG. 1 shows a foodstuff conveyor apparatus 1 according to the present invention. The apparatus 1 has a foodstuff inlet 3 and a foodstuff outlet 5. A conveyor path extends between the foodstuff inlet 3 and the foodstuff outlet 5. Part of the conveyor path is a conveyor chamber 7. A conveyor screw 9 extends into the conveyor chamber. The conveyor screw 9 can be provided in the form of a single conveyor screw in the conveyor chamber 7, or as part of a double spindle pump, in which case conveyor screw 9 can represent a first conveyor screw. FIG. 3 shows the arrangement of two conveyor screws in the conveyor chamber 7.

Figure 2:
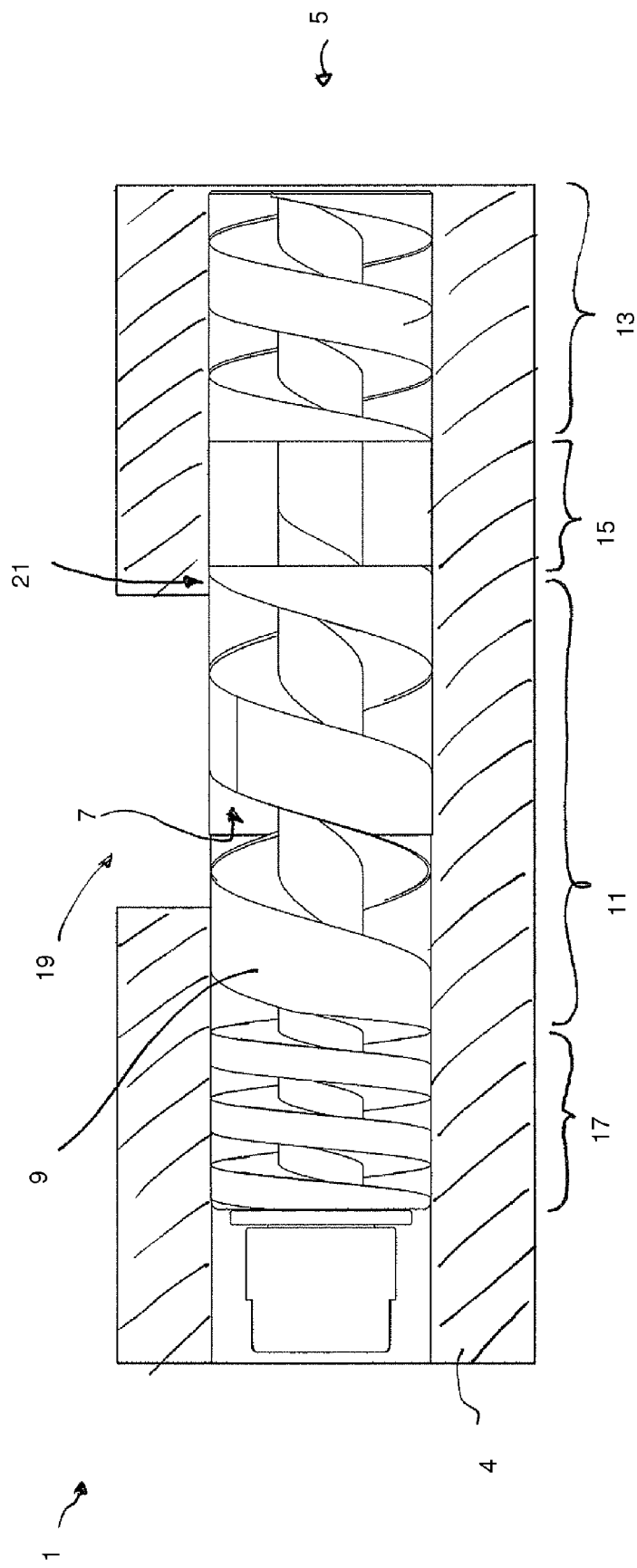
FIG. 2 shows a detailed sectional view of the apparatus according to the invention.

FIGS. 1 and 2 are also applicable in regard to an embodiment of the apparatus 1 having only one conveyor screw, according to the invention.

The conveyor screw 9 has in the conveyor chamber 7 an inlet-side spindle portion 11, and an outlet-side spindle portion 13. A spindle-free portion 15 extends between the inlet-side and the outlet-side spindle portions 11, 13. Provided in the spindle-free portion 15 is a cavity that is delimited outwardly by the wall of the conveyor chamber 7, and inwardly by the shaft of the conveyor screw 9. In the case of a conveyor chamber having two conveyor screws that each have a respective spindle-free portion, the cavity is defined by the two spindle-free portions. Preferably, in the case of a conveyor chamber equipped with two conveyor screws, the spindle-free portions are arranged axially at the same height (see FIG. 3).

The conveyor chamber 7 is disposed in a main body 4 having a housing that is equipped with feet points 6 for erection at the location of operation.

The partly sectional view in FIG. 2 shows the arrangement of various portions in the conveyor chamber 7 in the longitudinal or axial direction thereof. On a side of the inlet-side spindle portion 11 that is away from the outlet-side spindle portion 13 and the spindle-free portion 15, the conveyor screw 9 is arranged in the conveyor chamber 7 to have a spindle portion 17 with a greatly reduced spindle pitch. The greatly reduced spindle pitch in the spindle portion 17 prevents an excessive amount of foodstuff, and in the best case scenario no foodstuff at all, from being distributed from the conveyor chamber inlet 19 upstream in opposite relationship to the conveying direction in the conveyor chamber. This reduces impurities and facilitates maintenance. In particular, this affords protection for the vacuum pump from sucking in product. The spindle portion 17 goes into the inlet-side spindle portion 11, which has a given pitch. The pitch is adapted to convey foodstuff that is supplied by the conveyor chamber inlet 19 with a first volume flow in the direction of the foodstuff outlet 5.

The spindle-free portion 15 is arranged downstream of the inlet-side spindle portion 11. The spindle-free portion 15 is of a predetermined length, preferably being of a minimum length of 10 mm or more. The spindle-free portion 15 is adapted to collect and mix foodstuff that is fed thereto by the conveyor screw 9 or the conveyor screws.

The outlet-side spindle portion 13 is arranged downstream of the spindle-free portion 15. The outlet-side spindle portion 13 has a spindle pitch that is reduced in comparison with the pitch of the inlet-side spindle portion 11. This reduced spindle pitch results in the foodstuff fed to the outlet-side spindle portion being conveyed away at a lower flow speed, that is to say as a smaller volume flow, than the foodstuff being supplied by the inlet-side spindle portion. This has two effects. On the one hand, the spindle-free portion 15 is completely filled with foodstuff. On the other hand, compacting of the foodstuff takes place in the spindle-free portion 15, and to a certain degree, thereafter in the outlet-side spindle portion 13. The homogeneity of the foodstuff is increased by that compacting effect and mixing of the foodstuff in the spindle-free portion 15 by air bubbles being distributed and reduced in size. In addition, air is displaced by the compression effect.

For an advantageous mode of operation, the spindle portion 15 is arranged downstream of the conveyor chamber inlet 19, and is closed off in foodstuff-tight relationship in relation thereto or in relation to the conveyor chamber wall in a region 21. This is intended to mean that foodstuff conveyed into the spindle-free portion 15 cannot escape externally along the conveyor chamber wall in opposite relationship to the conveying direction. Optionally, the sealing effect can be selected, and in particular, a gap can be provided in such a way that the displaced gas can escape.

FIG. 3 shows a plan view of the detail view of FIG. 2. FIGS. 1 and 2 still leave open the question of whether the apparatus according to the invention involves a conveyor chamber 7 having a single conveyor screw 9 or having a plurality of conveyor screws. FIG. 3 shows an arrangement of an embodiment having two conveyor screws. The FIG. 3 apparatus has a first conveyor screw 9 and a second conveyor screw 29 in the conveyor chamber 7. The conveyor screws are of a corresponding configuration, in particular being mirror-image reversed, and are in a meshing engagement with each other. The first conveyor screw 9 is of a structure as shown in FIGS. 1 and 2. The second conveyor screw 29 similarly has an inlet-side spindle portion 31 and an outlet-side spindle portion 33 with a spindle pitch that is reduced in comparison with the inlet-side spindle portion 31. The inlet-side spindle portion 31 and the outlet-side spindle portion 33 are separated or spaced from each other by a spindle-free portion 35. The spindle-free portions 15, 35 are arranged axially at one height so that they form an interconnected free space between the shafts of the conveyor screws 9, 29 and the wall of the conveyor chamber 7. The inlet-side spindle portions 11, 31 are arranged in FIG. 3 directly beneath the conveyor chamber inlet 19, assuming a plan view.

On the side of the inlet-side spindle portion 31 that is away from the outlet-side spindle portion 33 and the spindle-free portion 35, the second conveyor screw 29 has a spindle portion 37 of greatly reduced spindle pitch. This performs the same function as the spindle portion 17 of the first conveyor screw 9.

The invention claimed is:

1. A foodstuff conveyor apparatus comprising:
    a foodstuff inlet;
    a foodstuff outlet;
    a conveyor chamber arranged between the foodstuff inlet and the foodstuff outlet, the conveyor chamber having a wall;
    a first conveyor screw extending in the conveyor chamber, the first conveyor screw having an inlet-side spindle portion, an outlet-side spindle portion, and a spindle-free portion separating the inlet-side spindle portion from the outlet-side spindle portion, and a pitch of the first conveyor screw in the outlet-side spindle portion being less than a pitch of the inlet-side spindle portion, the first conveyor screw sealed off at least in a region between the foodstuff inlet and the spindle-free portion of the first conveyor screw relative to the wall of the conveyor chamber to prevent a transfer of foodstuff from the spindle-free portion of the first conveyor screw in a direction of the foodstuff outlet; and
    a second conveyor screw extending in the conveyor chamber and in meshing engagement with the first conveyor screw, the second conveyor screw having an inlet-side spindle portion, an outlet-side spindle portion, and a spindle-free portion separating the inlet-side spindle portion from the outlet-side spindle portion.

2. The apparatus of claim 1 wherein the spindle-free portion of the first conveyor screw and the spindle-free portion of the second conveyor screw are arranged axially at one height in the conveyor chamber.

3. The apparatus of claim 1 wherein the spindle-free portion of the first conveyor screw is arranged downstream of a conveyor chamber inlet.

4. The apparatus of claim 1 wherein 1.5 or more spindle revolutions are provided in the outlet-side spindle portion of the first conveyor screw.

5. The apparatus of claim 1 wherein 5 or fewer spindle revolutions are provided in the outlet-side spindle portion of the first conveyor screw.

6. The apparatus of claim 1 wherein the spindle-free portion of the first conveyor screw has an axial length in a range of between 10 mm and 100 mm.

7. A method of conveying a foodstuff, the method comprising:
    introducing the foodstuff into a conveyor device through a foodstuff inlet;
    conveying the foodstuff through a conveyor chamber in the direction of a foodstuff outlet, wherein the foodstuff is conveyed in the conveyor chamber first and second conveyor screws in meshing engagement with each other, and the foodstuff in the conveyor chamber passes through a spindle-free portion of the first conveyor screw that separates an inlet-side spindle portion of the first conveyor screw and an outlet-side spindle portion of the first conveyor screw, and the foodstuff in the chamber passes through a spindle-free portion of the second conveyor screw that separates an inlet-side spindle portion of the second conveyor screw and an outlet-side spindle portion of the second conveyor screw;

portioning the conveyed foodstuff with the first and second conveyor screws by passing the foodstuff through an outlet-side spindle portion of the first and second conveyor screws, wherein the pitch of the outlet-side spindle portion of the first conveyor screw is less than a pitch of the inlet-side spindle portion of the first conveyor screw; and bringing the foodstuff conveyed by the first conveyor screw together with the foodstuff conveyed by the second conveyor screw in the respective spindle-free portions, wherein the first conveyor screw is sealed off at least in a region between the foodstuff inlet and the spindle-free portion of the first conveyor screw relative to a wall of the conveyor chamber to prevent a transfer of foodstuff from the spindle-free portion of the first conveyor screw in a direction of the foodstuff outlet.

8. The method of claim 7 wherein the spindle-free portions of the first conveyor screw and the second conveyor screw are arranged axially at one height in the conveyor chamber.

9. The method of claim 7 wherein the foodstuff conveyed by the first conveyor screw is brought together with the foodstuff conveyed by the second conveyor screw downstream of a conveyor chamber inlet.

10. The method of claim 7 wherein the spindle-free portion of the first conveyor screw and the spindle-free portion of the second conveyor screw are arranged downstream of a conveyor chamber inlet.

11. The method of claim 7 wherein 1.5 or more spindle revolutions are provided in the outlet-side spindle portion of the first conveyor screw and in the outlet-side spindle portion of the second conveyor screw.

12. The method of claim 7 wherein 5 or fewer spindle revolutions are provided in the outlet-side spindle portion of the first conveyor screw and in the outlet-side spindle portion of the second conveyor screw.

13. The method of claim 7 wherein 1.5 to 2.5 spindle revolutions are provided in the outlet-side spindle portion of the first conveyor screw.

* * * * *

UNITED STATES PATENT AND TRADEMARK OFFICE
CERTIFICATE OF CORRECTION

| | |
|---|---|
| PATENT NO. | : 8,757,865 B2 |
| APPLICATION NO. | : 14/031232 |
| DATED | : June 24, 2014 |
| INVENTOR(S) | : Uwe Pankoke et al. |

Page 1 of 1

It is certified that error appears in the above-identified patent and that said Letters Patent is hereby corrected as shown below:

In the Claims:

At column 6, claim number 7, line number 59, after "chamber" insert --by--

Signed and Sealed this
Ninth Day of December, 2014

Michelle K. Lee
*Deputy Director of the United States Patent and Trademark Office*